US009140906B1

(12) United States Patent
Wanderer et al.

(10) Patent No.: US 9,140,906 B1
(45) Date of Patent: Sep. 22, 2015

(54) ADJUSTABLE IN-SITU DEVICE TO STABILIZE AND MAINTAIN POSITIONING OF EYEWEAR ON A USER

(71) Applicant: Huggoptics, LLC, Bozeman, MT (US)

(72) Inventors: Alan Wanderer, Bozeman, MT (US); David Yakos, Bozeman, MT (US); Seth Carlstrom, Bozeman, MT (US)

(73) Assignee: HUGGOPTICS, LLC, Bozeman, MT (US)

( * ) Notice: Subject to any disclaimer, the term of this patent is extended or adjusted under 35 U.S.C. 154(b) by 0 days.

(21) Appl. No.: 14/339,135

(22) Filed: Jul. 23, 2014

Related U.S. Application Data

(60) Provisional application No. 61/978,430, filed on Apr. 11, 2014.

(51) Int. Cl.
G02C 5/14 (2006.01)
G02C 3/00 (2006.01)
G02C 11/00 (2006.01)

(52) U.S. Cl.
CPC ............... *G02C 5/143* (2013.01); *G02C 3/003* (2013.01); *G02C 3/006* (2013.01); *G02C 11/00* (2013.01); *G02C 2200/32* (2013.01)

(58) Field of Classification Search
CPC ............. G02C 3/003; G02C 5/16; G02C 5/04
USPC ................... 351/123, 122, 117, 156
See application file for complete search history.

(56) References Cited

U.S. PATENT DOCUMENTS

| 1,819,738 A | 8/1931 | Daniels |
| 2,626,538 A | 1/1953 | Frum |
| 3,502,396 A | 3/1970 | Greenberg |
| 3,879,804 A | 4/1975 | Lawrence |
| 4,133,604 A | 1/1979 | Fuller |
| 4,657,364 A | 4/1987 | Murrell |
| 4,662,729 A | 5/1987 | Dobson |
| 4,793,702 A | 12/1988 | Ahrens et al. |
| 5,002,381 A | 3/1991 | Murrell |
| 5,054,903 A | 10/1991 | Jannard et al. |
| 5,249,001 A | 9/1993 | Jannard |
| 5,790,229 A * | 8/1998 | Poloni et al. .................. 351/123 |
| 5,929,966 A | 7/1999 | Conner |
| 6,000,795 A | 12/1999 | Van Rysselberghe |
| 6,053,612 A | 4/2000 | MacIntosh, Jr. et al. |

(Continued)

FOREIGN PATENT DOCUMENTS

WO 00/22475 4/2000

OTHER PUBLICATIONS

International Searching Authority, "The International Search Report and the Written Opinion" issued on behalf of International Application No. PCT/US15/23793, mailed Jun. 29, 2015.

*Primary Examiner* — Hung Dang
(74) *Attorney, Agent, or Firm* — McKee, Voorhees & Sease, PLC

(57) ABSTRACT

Devices for eyewear and eyeglasses providing in situ adjustability to stabilize and maintain positioning of the eyewear and/or eyeglasses on a user are disclosed. The devices are further suitable for use in conjunction with a retainer strap and/or integrated with a retainer strap. The devices are further suitable for integration into the manufacture of eyewear and/or eyeglasses. Embodiments of the device and methods of employing the same are set forth.

20 Claims, 13 Drawing Sheets

(56) References Cited

U.S. PATENT DOCUMENTS

| | | | |
|---|---|---|---|
| 6,059,408 | A | 5/2000 | Bonacci |
| 6,450,640 | B1 | 9/2002 | Van Rysselberghe |
| 6,511,176 | B2 | 1/2003 | Kliot |
| 6,941,619 | B2 | 9/2005 | Mackay et al. |
| 7,070,273 | B2 | 7/2006 | Benavides et al. |
| 7,399,079 | B2 | 7/2008 | Skuro |
| 7,441,891 | B2 | 10/2008 | Schatz |
| 7,467,867 | B1 | 12/2008 | Williams |
| 7,556,373 | B2 | 7/2009 | VanAtta et al. |
| 7,845,795 | B2 | 12/2010 | Williams |
| 7,862,168 | B1 | 1/2011 | Yang |
| 8,025,397 | B2 | 9/2011 | Martin et al. |
| D669,115 | S | 10/2012 | Kalbach |
| 8,523,350 | B2 | 9/2013 | Krisik et al. |
| 8,733,926 | B2 | 5/2014 | Stewart |
| 2005/0286013 | A1 | 12/2005 | Aylor |
| 2012/0033410 | A1 | 2/2012 | Garman et al. |
| 2012/0113381 | A1 | 5/2012 | Jacquier et al. |
| 2012/0307199 | A1 | 12/2012 | Krisik et al. |
| 2013/0077043 | A1 | 3/2013 | Moran |
| 2013/0278882 | A1 | 10/2013 | Stewart |

\* cited by examiner

ADJUSTABLE IN-SITU DEVICE TO STABILIZE AND MAINTAIN POSITIONING OF EYEWEAR ON A USER

CROSS REFERENCE TO RELATED APPLICATIONS

This application claims priority under 35 U.S.C. §119 to provisional application U.S. Ser. No. 61/978,430 filed Apr. 11, 2014, all of which is herein incorporated by reference in their entirety.

FIELD OF THE INVENTION

The present invention relates to the fields of eyewear and eyeglasses and the term eyewear shall be used to represent all known eyewear, including sunglasses, visual acuity correcting eyeglasses, safety eyewear and all other eyewear that are commonly used. More specifically, the invention relates to device(s) that can be adjusted in situ to allow stabilizing and maintaining the position of eyewear on the user. It can also be used in conjunction with a retainer strap and/or be integrated with a retainer strap. Lastly it can be integrated into the manufacture of eyewear. The present invention provides devices and methods of employing these novel elements.

BACKGROUND OF THE INVENTION

Various commercial products and/or patents are available for stabilizing and maintaining the position of eyewear on a user. These references can be separated into several classes: 1. tubular cylindrical devices that are added to temples to retain glasses on a user; 2. tubular cylindrical devices added to temples that include a curved retainer that is positioned behind a user's ears; 3. curved discs that fit onto temples and are positioned around the mastoid bone; and 4. hybrid adjustable retainer straps that prevent eyewear from falling off a user and contain elements of devices that maintain the position of eyewear on a user, such as tubular cylindrical elements with or without curved elements.

U.S. Patents relevant to the first class of using tubular cylindrical devices to stabilize and maintain position of eyewear include U.S. Pat. Nos. 2,626,538; 5,002,381; 5,054,903; 8,733,926; and U.S. Patent Application 2005/0286013. They show an ear contact tubular or cylindrical element that can slide onto the temple(s) of eyewear to preclude slippage of eyewear forward and downward on a user's nose and face. All involve a non-adjustable one size radius tubular concentric device intended to maintain interference fitment between the user's head and the temples containing the tubular device. If the size is not correct for optimal interference fitment, the tubular device would have to substitutes for one with a different radius for optimal interference fitment. U.S. Pat. No. 5,054,903 shows another example of a tubular segment on a temple to prevent slippage of the glasses forward on a user's nose and face. The tubular segment is positioned in a recess to keep it in place from moving forward or backwards. This invention also lacks the ability to increase the radius of the tubular segment in situ without exchanging to a different radius-sized tubular segment. U.S. Pat. No. 8,733,926 shows a cylindrical or other shaped columns, such as hexagonal, rectangular or square prisms, to fit onto the distal ends of temples of eyewear. It teaches a column that fits on the distal ends of the temples and includes a channel that is located at the center of the column, and does not teach off-centered channels, such as an eccentric shape with different radii that could be rotated on temples to obtain the best radius of the column for optimal interference fitment of temples on a user. A single radius cylinder or column located on eyewear temples may not retain the eyewear from moving forward because the connecting means located between temples and the eyewear lens component, have lateral movement capability to permit eyewear to be worn for users with different head sizes. As a consequence the single radius of a concentric column or column device placed on the eyewear temple may not allow adequate interference fitment of the eyewear on a user. Moreover a single radius cylinder or column on eyewear temples are often positioned on the upper ledge of the ear between the user's head and pinnae. There is less interference fitment means to retain the eyewear in that location and additionally that location forces the pinnae laterally creating an unpleasant aesthetic appearance for a user.

The second class involves using a tubular part with a curved element placed on temples and are located behind a user's ears. U.S. Pat. Nos. 2,626,538; 6,000,795; and 6,450,640 describe examples of this class. The tubular contact member are designed with one diameter located on the temples and have a downward member that curves concavely to conform to the upper posterior surface of the base of the ear. In essence the tubular elements have one radius which precludes adjustment in situ to a different radius to improve contact between the user's head and the tubular element. In addition although the curved element holds the eyewear from moving forward away from a user's nose and face, it has a single radius that cannot be adjusted in situ to another more optimal radius to minimize anterior and/or lateral movement, and thereby stabilize and maintain the position of eyewear on a user. Moreover these devices do not provide easy pivoting means to permit superior eyewear positioning onto the top of a user's head or forehead and do not provide means to maintain and stabilize interference fitment of eyewear when positioned in that location.

The third class represented by U.S. Pat. No. 7,862,168 utilizes curved disc extensions attached to the distal ends of the temples where they are located onto the mastoid bones of the user. This device has one thickness/radius and cannot be switched in situ to a different thickness or radius to adjust for best fitment to preclude anterior or lateral movement of the eyewear on a user. Moreover these devices do not provide easy pivoting means to permit superior eyewear positioning onto the top of a user's head or forehead and do not provide means to maintain and stabilize interference fitment of eyewear when positioned in that location.

The fourth class are hybrid devices that stabilize and maintain position of eyewear in combination with adjustable retainer straps attached to temples which wrap around the posterior aspect of a user's head. U.S. Pat. No. 4,133,604 shows a retainer strap with a tubular element that fits onto temples. U.S. Pat. Nos. 4,657,364 and 5,002,381 have a curved element for positioning behind a user's ears and an adjustable retainer strap. U.S. Pat. Nos. 3,502,396; 3,879,804; 6,941,619; 7,399,079; and 7,845,795 all include a retainer strap that is adjustable to hold the eyewear tightly on the user's head. U.S. Pat. No. 4,133,604 has a tubular element with a retainer integrated onto it for slippage onto temples. U.S. Pat. No. 6,053,612 shows a tubular member on temples in combination with a retainer strap. U.S. Patent Application 2013/0077043 has a modular temple connecting accessory with a non-rotatable single radius temple element. The devices in this class teach a single radius cylindrical part that cannot change radius in situ to improve interference fitment with the user's head.

Despite the various products and/or patents known to stabilize and/or maintain the position of eyewear on a user, there remains a need for a device providing improved stabilization and adjustability. It is against this backdrop of products and written description that the present invention is set forth, notably overcoming the combined limitations of products in the state of the art.

It is an advantage of the invention to provide a device on eyewear that permits a user to adjust the device in situ, thereby stabilizing and maintaining the position of the eyewear on a user.

It is an advantage to provide a device on eyewear that can be adjusted by rotating the device in situ and/or move the device anteriorly or posteriorly on the temples to obtain an optimal radius interference fitment for maintaining contact between the user's head and the device, thereby stabilizing and maintaining the position of the eyewear on a user.

It is an advantage to provide a device on eyewear that will permit a user to exercise vigorously and reduce likelihood of eyewear from moving off from its optimal position on a user's head and nose.

It is an advantage to provide a device that will stabilize and maintain positioning of eyewear on a user when the eyewear is located on the user's nose, face and head or when the eyewear has been moved to the user's forehead or top of the head.

It is an advantage to provide a device that can stabilize and maintain user intended positions of eyewear on a user's nose, face and head or on top of a user's head or forehead and minimize dislocating from those intended positions.

It is advantage to provide a device on eyewear which can be integrated with a retainer strap and/or allow rotation of the device on temples without causing the retainer strap to curl on itself.

It is an advantage to include ridges and/or grooves and/or any roughened pattern on the exterior surface of device on eyewear to allow improved grip for the user to rotate or move the device in situ on the temples.

It is an advantage to add groves or gutter-like patterns onto the surface of the device that will allow water or perspiration beads to drain off or away from the device and thereby stabilize and maintain the position of eyewear on a user.

It is an advantage for a device to be integrated into eyewear temples thereby adding a multi-radius eccentric structure that can be rotated or moved laterally in situ on eyewear temples by a user to obtain the optimal radius interference fitment for maintaining contact between the user's head and the device.

Other objects, advantages and features of the present invention will become apparent from the following specification taken in conjunction with the accompanying drawings.

SUMMARY OF THE INVENTION

In an aspect, the present invention discloses novel devices capable of in-situ adjustment means to improve stabilizing and maintaining the position of eyewear on a user. In an aspect, the invention describes two in-situ adjustment means involving mound(s) that can be used alone or in combination. Both adjustment means rely on utilizing more than one radius of a mound that will permit in situ improved interference fitment of the eyewear on a user's head and thereby minimize displacement of the eyewear from a user. One adjustment means involves rotating a mound with more than one radius on temples. The other adjustment means provides for anterior/lateral advancement of a mound with incremental or different radii. Both allow the device to obtain the optimal radius interference fitment to preclude easy displacement of eyewear from a user.

The term in-situ in this application is used to describe an eyewear device(s) comprised of multi-radius mound(s) which can be adjusted on location, meaning the adjustment occurs without removing the mound device(s) from the eyewear. However, in some circumstances a user may elect to access a different radius of the multi-radius mound by first removing the mound from the eyewear, then reattaching the same mound to the eyewear so that a different mound radius can contact the user's head to optimize stabilizing and maintaining the position of eyewear on the user. Hence, the term in-situ has a broader definition for adjustment means in this application.

In an aspect, the present invention to stabilize and maintain positioning of eyewear on a user can: 1. be added as accessories to eyewear; 2. be integrated into eyewear manufacture; and 3. be integrated with a retainer strap.

While multiple applications and embodiments are disclosed, still other embodiments of the present invention will become apparent to those skilled in the art from the following detailed description, which shows and describes illustrative embodiments for applications of the invention. Accordingly, the drawings and detailed description are to be regarded as illustrative in nature and not restrictive.

Figure 1:
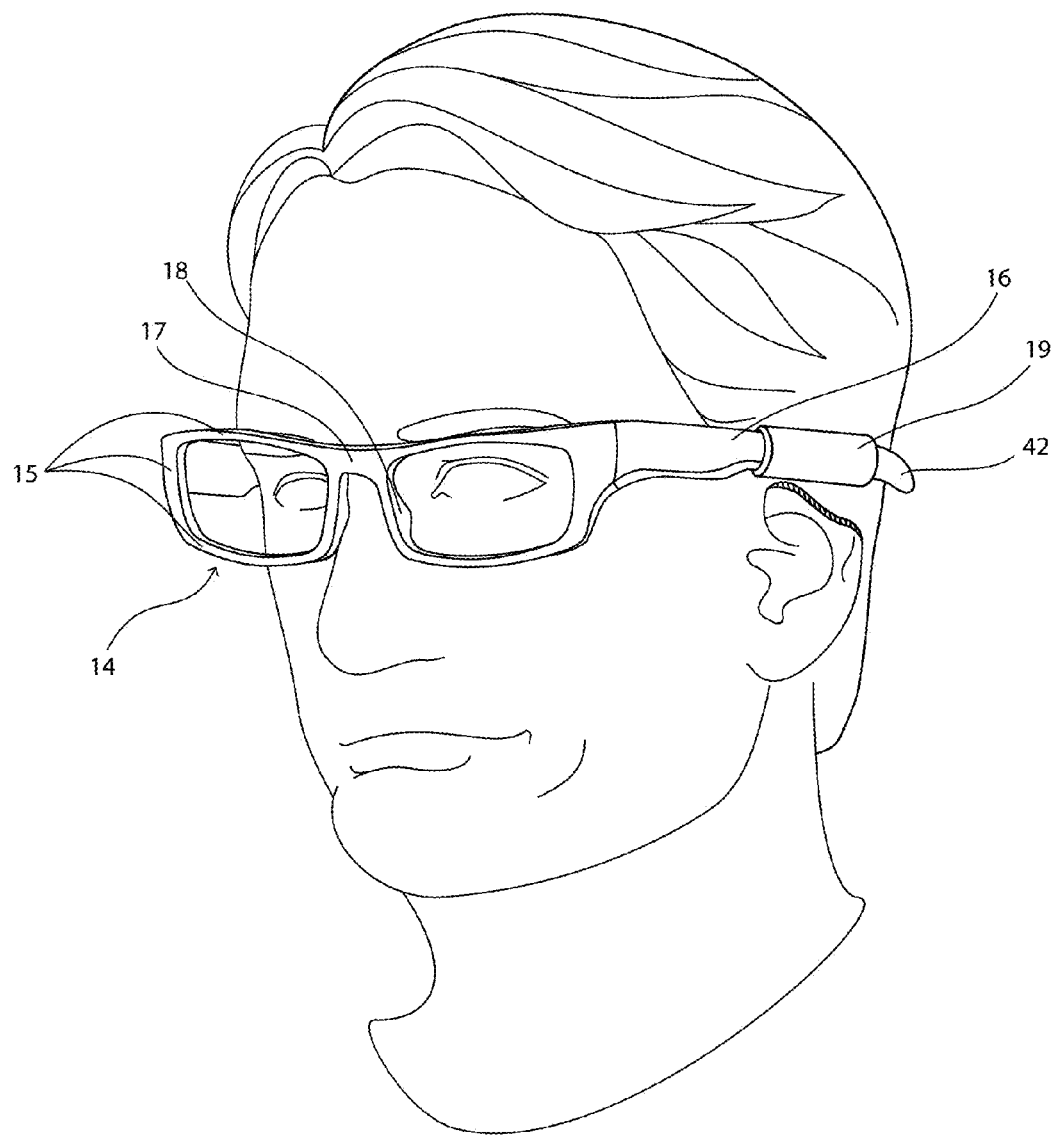
FIG. 1 shows a frontal and side perspective of a user wearing eyewear with a multi-radius mound device located on the distal section of the temple(s), according to an embodiment of a device for stabilizing and maintaining the position of eyewear on a user.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE INVENTION

In an aspect, the invention describes device(s) suitable for in situ adjustments. In a further aspect, the invention describes device(s) for stabilizing and maintaining the position of eyewear on a user.

The embodiments of this invention are not limited to the particular embodiments of the devices depicted, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can also include plural referents unless the content clearly indicates otherwise.

The devices of the present invention may comprise, consist essentially of, or consist of the components described herein as well as other components and elements. As used herein, "consisting essentially of" means that the device may include additional components, but only if the additional components do not materially alter the basic and novel characteristics of the claimed devices. It should also be noted that, as used in this specification and the appended claims, the term "configured" describes a device that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Eyewear 14, as depicted in FIG. 1, have a rigid or semi-rigid housing 15 comprising a bridge 17 that arches above and/or over a user's nose. It can contain structure with or without rims to contain a clear rigid or semi-rigid translucent barrier, such as lenses to overlay user's eyes. There are some eyewear without lenses and some rimless eyewear with lenses, but all have a bridge 17 and housing 15. Most eyewear include nose pads 18 or a saddle bridge (not shown) that are part of the housing 15 that contact the top sides of the user's nose. There are also temples 16, sometimes referred to as stems, connected to and are part of the housing 15, which position eyewear onto the superior ledge of a user's ears between the pinnae and lateral aspect of a user's head. The temples 16 have spring, joint or other flexible attaching mechanisms with the housing 15 to permit lateral and medial spread for optimal fitment of the eyewear onto the user's head, ears, nose and face. However an omnipresent problem exists for many users in that eyewear fitment is often loose and can cause slippage of the eyewear from the user.

Figure 2:
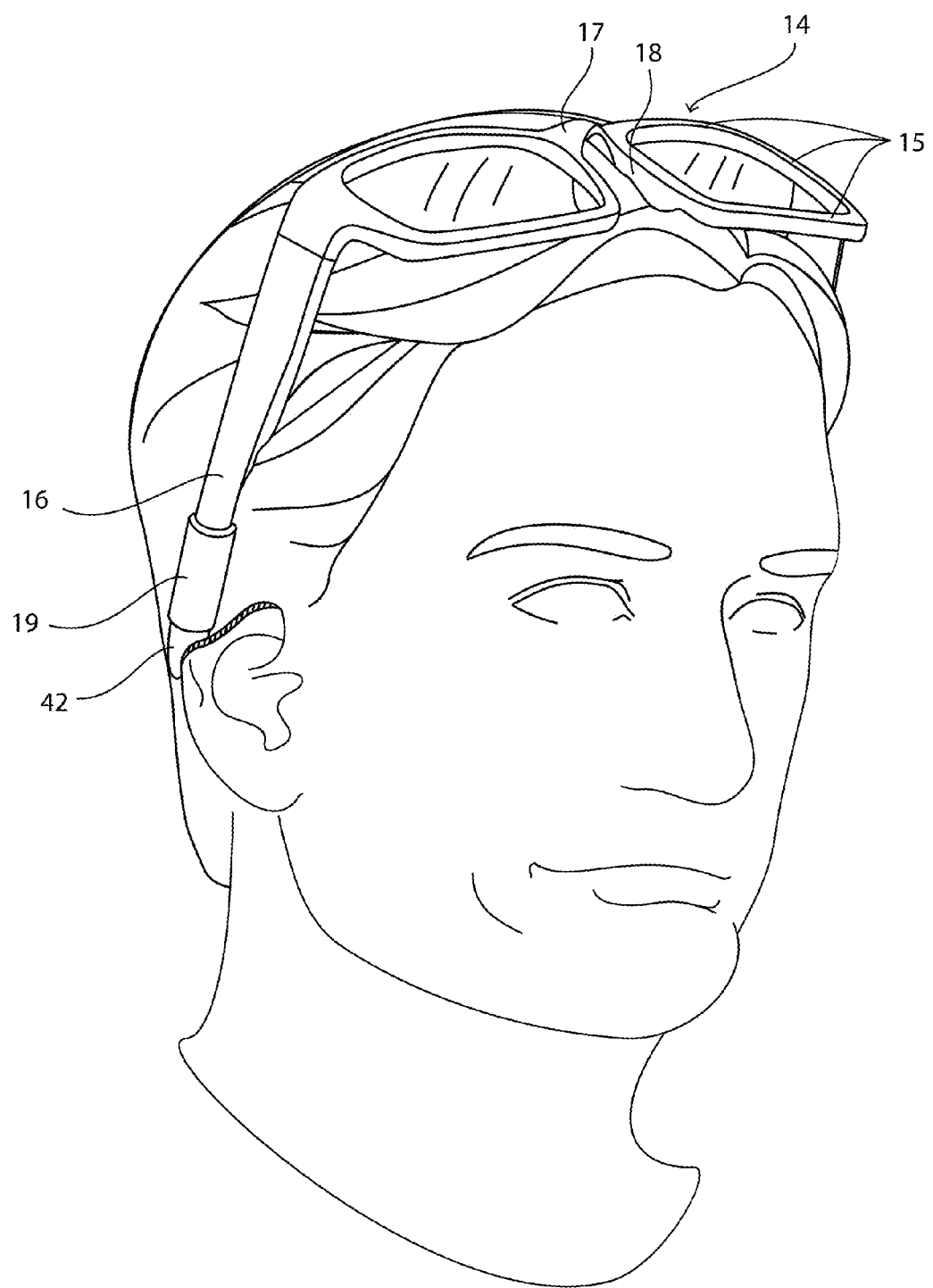
FIG. 2 shows a frontal and side perspective of a user having eyewear located on the top of the user's head, with the eyewear containing a multi-radius mound device on the distal section of the temple(s), according to an embodiment of a device for stabilizing and maintaining the position of eyewear on a user.

A compressible cylindrical mound, referred to as mound 19, is added onto the temples 16 of eyewear, FIGS. 1 and 2. In this example the mound 19 can be made of a compressible material (such as for example polyurethane; thermoplastics; neoprene; silicone) or other comparable materials. The mound 19 has a channel 21 seen in cross sections, FIGS. 3, 4, and 5, which allow mound 19 to be slipped over and onto the distal temple section 42. As referred to herein, the distal portion 42 or section of an eyeglass temple refers to the portion close to the center of the temple to the end of the temple (i.e. portion away from the point of attachment of the temple to the eyeglass housing 15). The interior of channel 21 can have inward protrusions or ridges 24 that minimize movement of the mound 19 on the temples and thereby inadvertent rotation of the mound 19 on the temple 16 or inadvertent anterior and/or posterior movement on the temples 16. The mound 19 can also have longitudinal slits (not shown) that permit attaching the mound 19 sideways onto temples 16, especially for eyewear with large sculptured temple ends that preclude slipping the mound 19 onto the temples 16. As such the longitudinal slits allow positioning of the mound 19 over the temples 16, and the mound 19 has the capacity to self-enclose around the temples 16 due to the inherent compressibility of the mound material to reform to its original shape. Mounds 19 can be also made from textile material with Velcro attachments to wrap around the temples. Means for attachment are not limited to the examples described herein.

When positioned correctly, the mound 19 on the distal section 42 of temples 16 creates an interference fitment with the lateral-posterior bone structure of the user's head, such as on the mastoid and/or the occipital bone(s). The contact interference fitment of the mound 19 with the user's head will be located slightly posterior and superior to the superior ledge of the external ear. However due to different configurations of temples and user's heads, the interference fitment can occur anywhere in contact to and/or close to and/or posterior to the user's ears.

Figure 3:
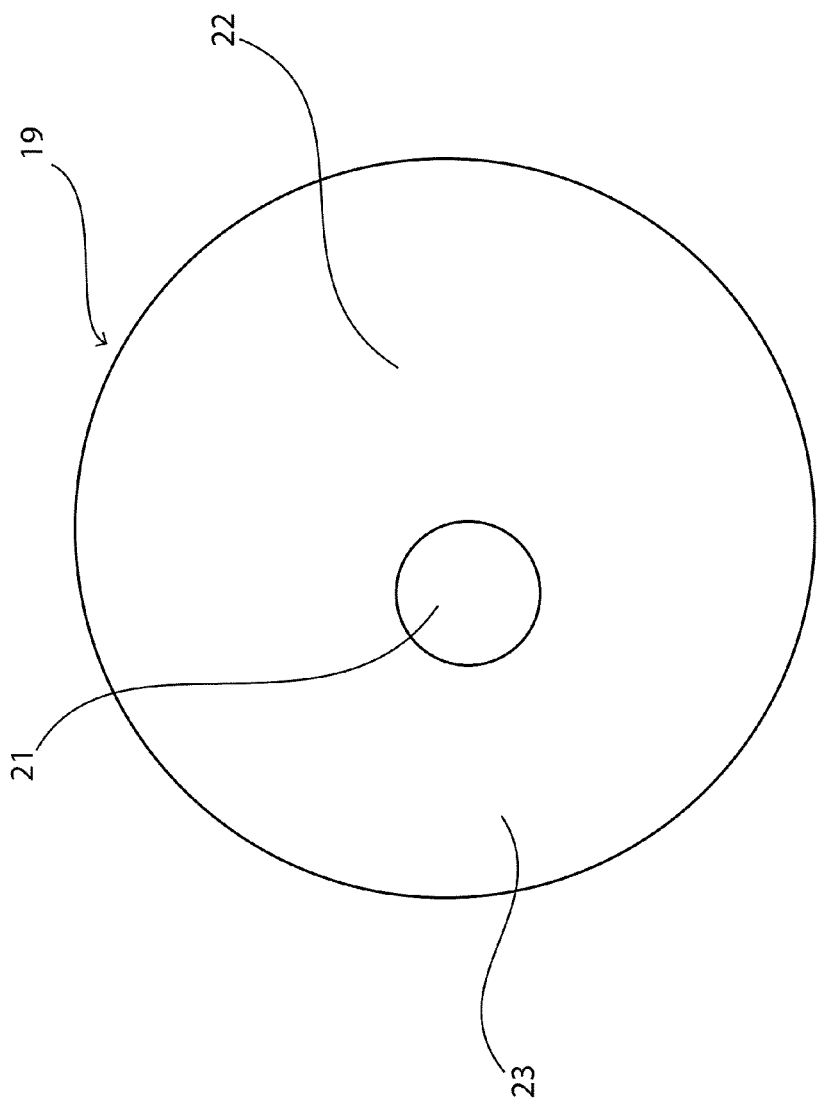
FIG. 3 shows a cross section of a multi-radius mound according to an embodiment of a device for stabilizing and maintaining the position of eyewear on a user.
Figure 4:
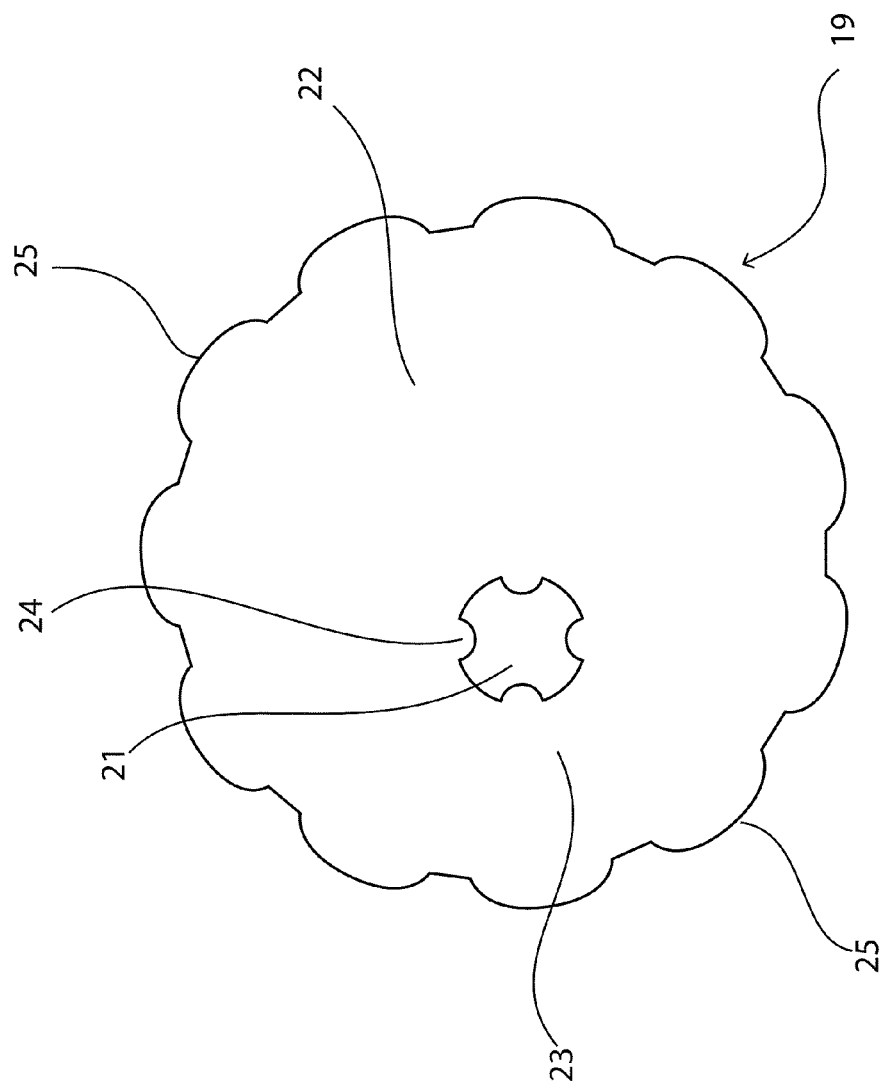
FIG. 4 shows a cross section of a multi-radius mound with circumferential longitudinal ridges and troughs, according to an embodiment of a device for stabilizing and maintaining the position of eyewear on a user.

The mound 19 added to the temples 16 can have different configurations and has more than one radius to accomplish in situ stabilizing and maintaining the position of eyewear on a user. The radius can be varied by simply rotating the mound 19 on the temples 16. FIG. 3 shows a cross section of a mound 19 embodiment with an eccentric shape having a channel 21 through it for slipping onto the distal temple section 42. As referred to herein, eccentric shall be understood to refer to a configuration having more than one radius, such that the channel 21 is away from the center or central axis of the mound 19. In this non-limiting example, one radius 22 surrounding the channel 21 is wider compared to a smaller radius on the other side 23 that surrounds channel 21. The radius of the mound is measured from the exterior circumference of the mound 19 to the lateral edge of channel 21. Rotating the mound 19 would allow in situ change in the radius to allow for optimal interference fitment of the device with the user's head to stabilize and maintain the position of eyewear on the user. Moreover the user can also remove the mound 19, and then reattach the same mound onto the distal temple section 42 so that a different radius can contact the user's head. In addition, FIG. 4, shows a cross section of a mound 19 with longitudinal ridges 25 on the perimeter that allow easier gripping to rotate the mound 19 on the temples. The mound can also have small ridges or protrusions 24 located on the internal surface of channel 21 to help improve grip of the mound 19 when it is attached to temple(s) 16. Additionally there can be diagonal gutters (not shown) on the external circumference of the mound 19 between the ridges that allow perspiration beads or water to drain away from the mound 19.

Figure 5:
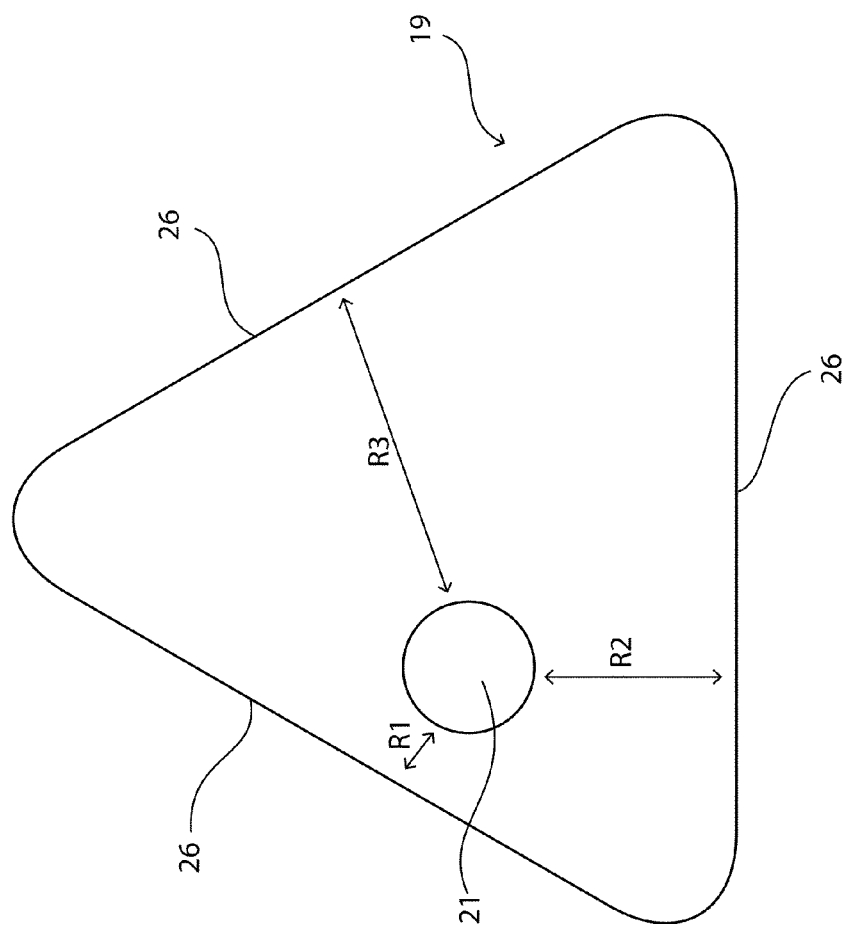
FIG. 5 shows cross section of a multi-radius mound with flat sides, according to an embodiment of a device for stabilizing and maintaining the position of eyewear on a user

In another non-limiting embodiment of the device as seen in FIG. 5, the cross section of the eccentric mound 19 has flat sides 26 with different radii (R1, R2, and R3) measured from the flat side to the lateral edge of the channel 21. Each radius width of R1, R2, and R3 allows user to rotate the mound 19 on the temple ends 42 to obtain the best interference fitment of the temples on the user's head. The flat sides 26 allow for increased contact surface of the mound to the user's head. Moreover flat sides allow the user to recognize when another radius of the mound 19 has been rotated into a functional position.

Other geometric mound shapes can be used to rotate the mound 19 circumferentially to obtain an optimal radius for interference fitment on the use's head. A circumferential cylindrical shape could be reduced to almost a ring shape (not shown) with eccentric radii. The mound shapes must not impede in the ability to rotate different radiuses on the temple to allow optimal interference fitment against the user's head. In a preferred embodiment, the rotational capacity should be 360 degrees to allow the user to rotate the mound 19 circumferentially clockwise or counterclockwise to obtain the radius that permits the best interference fitment between the user's head and the mound 19. However less than a 360 degree circumferential rotation can be designed with an eccentric mound 19 and still obtain the best radius interference fitment for the mound against the user's head. However if any shape is used it must be first, a functional shape that permits comfortable contact between the mound 19 and the user's head, and secondly be a shape that doesn't impair rotation to allow other radii to interpose between the user's head and mound 19.

Beneficially, the mound 19 can be retained in place even if the eyewear gets wet from water related activities, from rain or from perspiration, such as during vigorous exercise. This occurs because of any or all of the following reasons: 1. optimizing contact of the mound 19 with the user's head by rotating the mound to obtain the radius that achieves a comfortable interference fitment of the temples with user's head; and, 2. the mound can have grooves or gutters on its external surface which permit water to drain away similar to the effect created by automobile tire tread.

The optimal interference fitment also minimizes eyewear from slipping down the user's nose and face in multi-vectored directions, especially anteriorly, inferiorly and laterally, and thereby maintains the proper positioning of lenses on a user to maintain ideal visual acuity.

Figure 12:
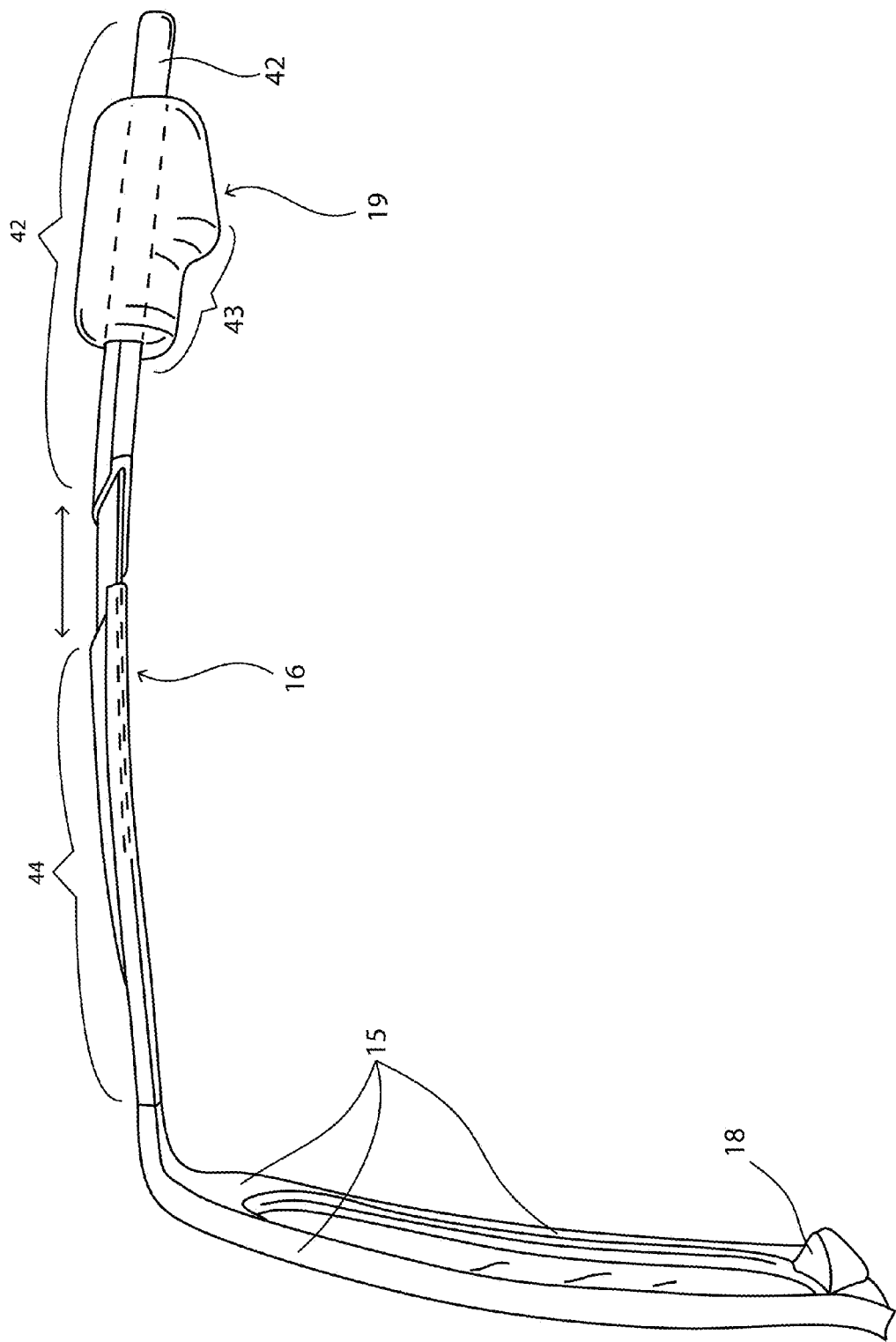
FIG. 12 shows a frontal and top perspective of a portion of eyewear with integrating temple sections with an attached incremental multi-radius mound, according to an embodiment of a device for stabilizing and maintaining the position of eyewear on a user.

In another embodiment, FIG. 12, the mound 19 can have step-up or transitional incremental sized radii 43 circumferentially, that are ideally located on one side of the mound 19, with the smallest to the largest radius emanating from its anterior end toward its posterior end. As noted, each radius may be slightly larger than the preceding anterior one. The user places the mound 19 onto the medial aspect of the distal section 42 of temples and then moves the mound 19 laterally, anteriorly and/or posteriorly, on the distal section 42 to allow an optimal radius to contact the user's head and thereby improve interference fitment against the head. The full length of the mound 19 can be short enough to preclude the mound 19 from moving onto the upper ledge of the ears which will cause the pinnae to distort laterally. The different radii for this mound 19 embodiment can be transitionally incremental or non-transitionally incremental.

The previously described rotating radius adjustment means and the incremental radius adjustment means of the mound 19 can be manufactured in combination or made so that each adjustment means can exist by itself. The posterior end of the mound 19 can be closed off so the mound 19 cannot be moved too far anteriorly to preclude its ability to create an interference fitment. However, this could preclude using the full anterior adjustment means of the mound 19 with incremental radiuses 43. It is also understood that the mound 19 could have incremental radiuses 43 located 360 degrees around the entire circumference of the mound 19, so that the user simply advances the mound anteriorly on the distal section 42 of temple(s) 16 to achieve the best interference fitment as described. However the aesthetic effect of the larger radii being visible on the lateral side of the mound 19 may not be as pleasing compared to having the incremental radii located on the medial side of the mound 19 where they would not be easily visible.

As seen in FIG. 2, the multi-radius mound 19 device provides yet another advantage to stabilize and maintain positioning of eyewear when the user positions the eyewear on the top of the head or on the forehead (not shown). The interference fitment of the mound 19 in contact with the user's lateral posterior side of head provides a pivotal means to permit the user to move the eyewear up onto the top of the head or forehead without displacing the eyewear off the user's head. Often for example, an eyewear user will need to move the eyewear off the nose up onto the forehead or top of the head to read something that might be blurred with corrective lenses. The interference fitment by the mound 19 provides pivoting means for the user to easily move the eyewear back to its original position on the user's head and nose. The multi-radius mound 19 minimizes anterior, lateral and inferior displacement when the eyewear is positioned in a first position on the user's nose and face, and it allows the eyewear to pivot to a superior second position on the top of the user's head or forehead and minimizes further superior-anterior displacement when positioned at that location.

Figure 6:
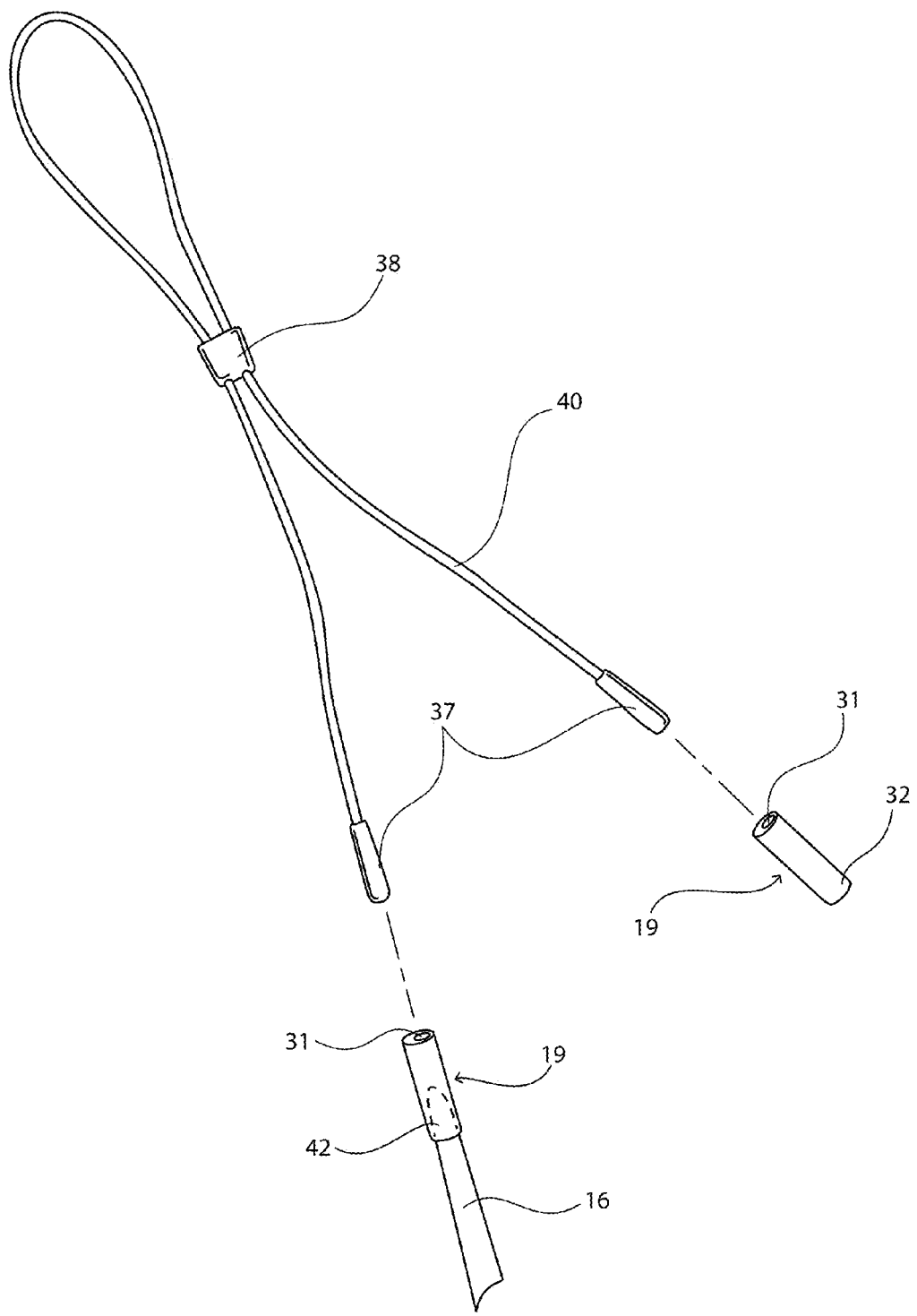
FIG. 6 shows a top perspective of a retainer strap with clamping means at its ends for attachment into multi-radius mounds, according to an embodiment of a device for stabilizing and maintaining the position of eyewear on a user.
Figure 8:
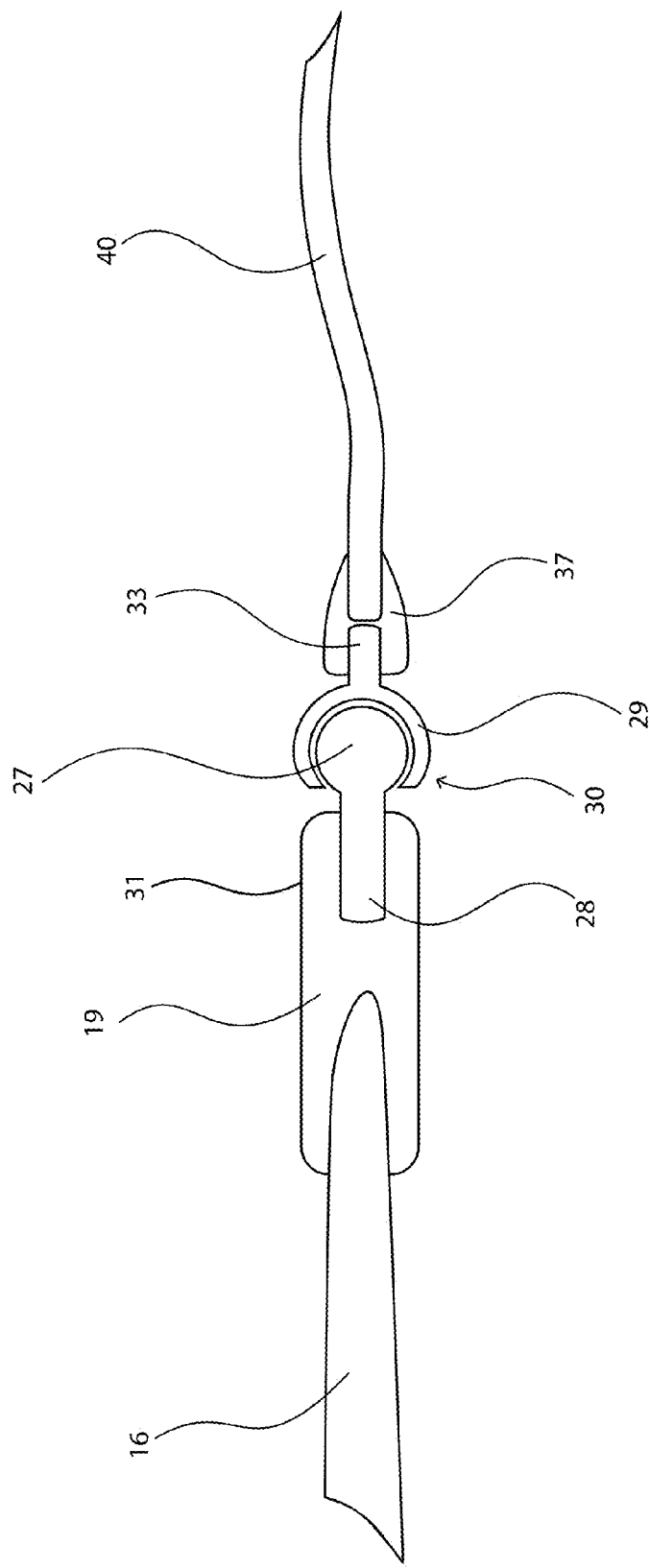
FIG. 8 shows a longitudinal section of a rotating joint attaching between a multi-radius mound and a clamping means of a retainer strap, according to an embodiment of a device for stabilizing and maintaining the position of eyewear on a user.

It is possible to integrate a retainer strap 40 with or without a tightening means 38, such as the commercially available Croakie® retainer straps, in combination with the mound 19, as shown in FIG. 6. In this embodiment the distal end 31 of the mound 19 would have a channel 21 large enough to fit over clamping means 37. The proximal end 32 of the mound 19 would then attach onto the distal temple section 42. Although this integration can be achieved, it should be noted that the rotating capability of the mound 19 could cause the retainer strap 40 to curl up on itself. To avoid this problem, FIG. 8, shows an embodiment with a ball and socket joint 30 formed between the distal end(s) of the mound 31 and the clamping means 37 of the retainer strap 40 which normally attaches to the distal section 42 of the temples 16. The ball and socket joint 30 is comprised of two parts using a semi-rigid or rigid plastic. One part has a ball shape 27 and a proximal end 28 that fits into the distal end 31 of the mound 19 that projects off and distally away from the distal temple section 16. The second part is comprised of a socket 29 that fits around the ball 27 and has a distal end 33 that allows fitment into the clamping means 37 of the retainer strap 40. The ball and socket joint 30 can be assembled as one piece or be separate parts, and are attached between the mound 19 and the retainer strap 40. When the retainer strap 40 is attached to the mound 19 via this ball-socket joint 30, rotation of the mound(s) 19 on the temple(s) 16 would occur independently of the retainer strap 40, so that the latter does not curl up on itself. Other designs known to those familiar with rotating joints could be incorporated to achieve the same function as described herein, and/or other materials capable of allowing free independent rotation of the mound 19 in relation to a stationary retainer strap 40.

Figure 7:
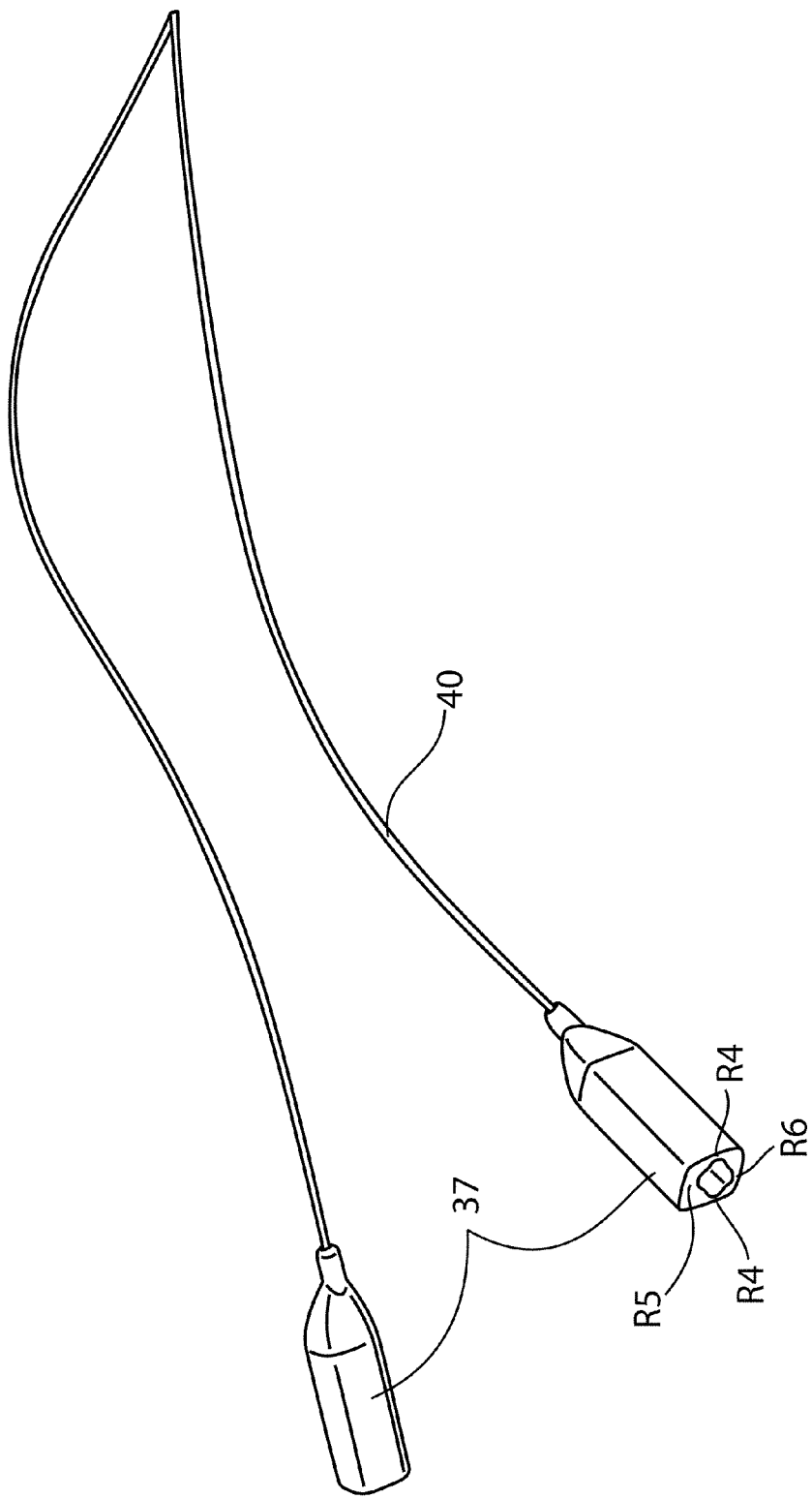
FIG. 7A shows a top and side perspective of a retainer strap with multi-radius mounds configured with a clamping means of the retainer strap, according to an embodiment of a device for stabilizing and maintaining the position of eyewear on a user.
FIG. 7B is an enlarged perspective of embodiment of a device in FIG. 7A comprised of a multi-radius mound-clamping means combination with the retainer strap for stabilizing and maintaining the position of eyewear on a use.
FIG. 7C is a cross section of the device comprised of a multi-radius mound-clamping means combination seen in FIG. 7A, according to an embodiment for stabilizing and maintaining the position of eyewear on a user.
Figure 7:
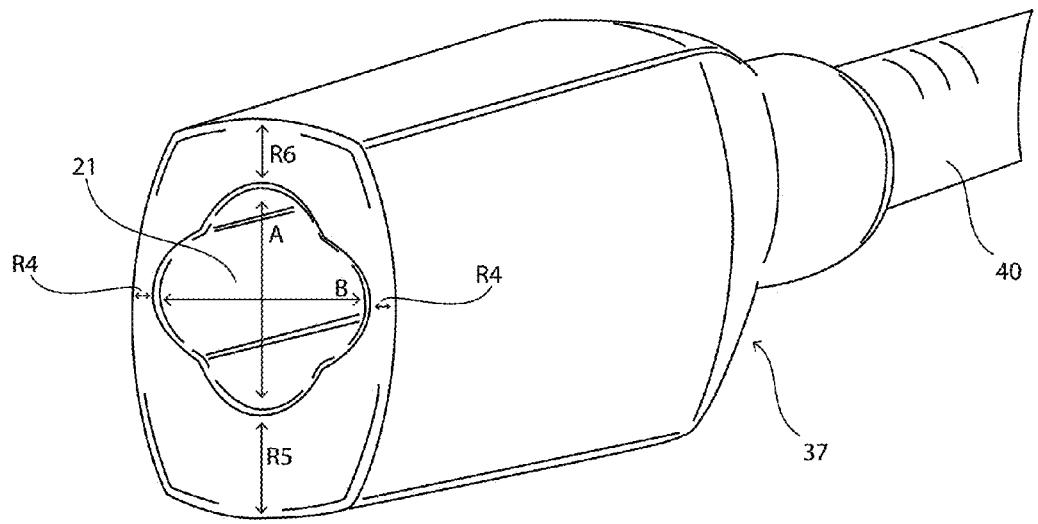
Figure 7:
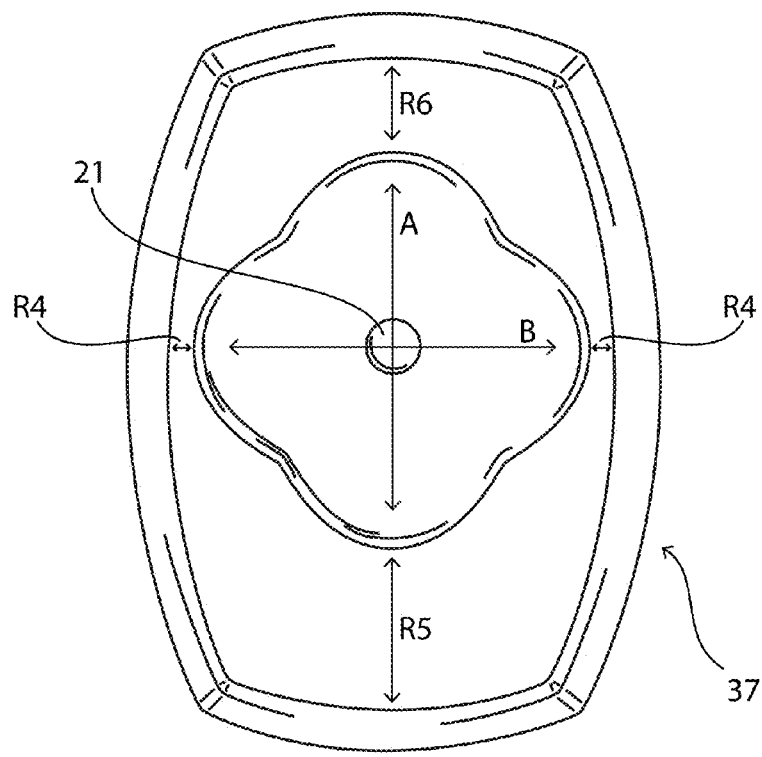

In another embodiment of a retainer strap 40 in combination with a mound 19, the clamping means 37 shown in FIG. 6, that attaches the retainer strap 40 to the distal section 42 of temple(s) 16, can be configured as one entity combined with a mound 37 having multi-radii (R4, R5 and R6), FIGS. 7A, 7B and 7C. This multi-radius mound-clamping means (abbreviated MRMCM) 37 embodiment is seen in cross section, FIG. 7C with two channels seen A and B, and channel 21 for attachment onto distal temple section 42. In a normal commercially available retainer 40 with clamping means seen in FIG. 6, radiuses R4 are the same and sit in channel A for attachment of the clamping means 37 with a retainer strap 40 to the distal section 42 of temple(s) 16. In FIG. 7C there are two additional different radiuses, R5 and R6, that sit in channel B when placed onto the distal section 42 of the temples. Once the MRMCM 37 is attached to the distal section 42 of the temple(s) 16 into channel A, the eyewear is then positioned in its normal use position on the user at a location near the occipital-mastoid region of the user's head with R4 contacting the user's head. When viewing posteriorly on the right side of user's head, clockwise rotation of the MRMCM 37 in FIG. 7C moves it from channel A to channel B on the distal section 42 of temples causing radius R5 to engage the user's head. If radius R5 does not allow for optimal interference fitment, counterclockwise rotation of MRMCM 37 will move it back into its original position in channel A, and then the user can continue to rotate it counterclockwise into channel B to access radius R6. Although rotation of the MRMCM 37 can cause some curling of the retainer strap 40, it is minimal as there is a maximum 90 degree clockwise or counterclockwise rotation from the normal position of the MRMCM 37 out of channel A to sit either R5 or R6 into place. It is also possible in a further embodiment to have extra different radii added to the medial and lateral sides instead of to the inferior and superior sides as with the MRMCM 37 embodiment, but access to each radius will require a maximum 180 degrees rotation which causes more curling of the retainer strap. It is possible in a further embodiment to include a rotational joint means as shown in FIG. 8 connecting the MRMCM 37 to retainer strap 40 to minimize curling of the retainer strap 40 when MRMCM 37 is rotated in situ. In essence these embodiments have two functions: 1. optimizes interference fitment with the user's head which will stabilize and maintain the eyewear on a user; 2. has the added protection of protecting the eyewear from falling off a user if displaced from a user's head.

Although not shown the MRMCM 37 could have incremental radii (seen in FIG. 12) located from its anterior to posterior end, so that it could not only be rotated on the distal section 42 of the temple but it could be moved slightly anteriorly on the distal section 42 of the temples to obtain optimal interference fitment with the user's head. It is understood that either rotational adjustment and/or anterior/lateral adjustment means could be separately configured or combined with a retainer strap 40.

A typical commercial clamping means 37 in FIG. 6 of a retainer strap is traditionally shaped as a rectangle with the same radii on the medial and lateral sides that contact around the user's ears and different but same radii on the superior and inferior sides. These clamping means have one channel for setting onto the distal section 42 of temples(s) and are not intended or designed for rotation on the distal section 42 of temples. Hence even though these commercial clamping means 37 may have two radiuses, one that is the same on the superior and inferior sides and a second different one that is the same on the medial and lateral sides, they do not have the internal structure for setting different radii into a second channel to maintain the clamping means 37 in place. They are designed only for a total of two radii instead of three or more in the aforementioned embodiment of MRMCM 37.

Figure 11:
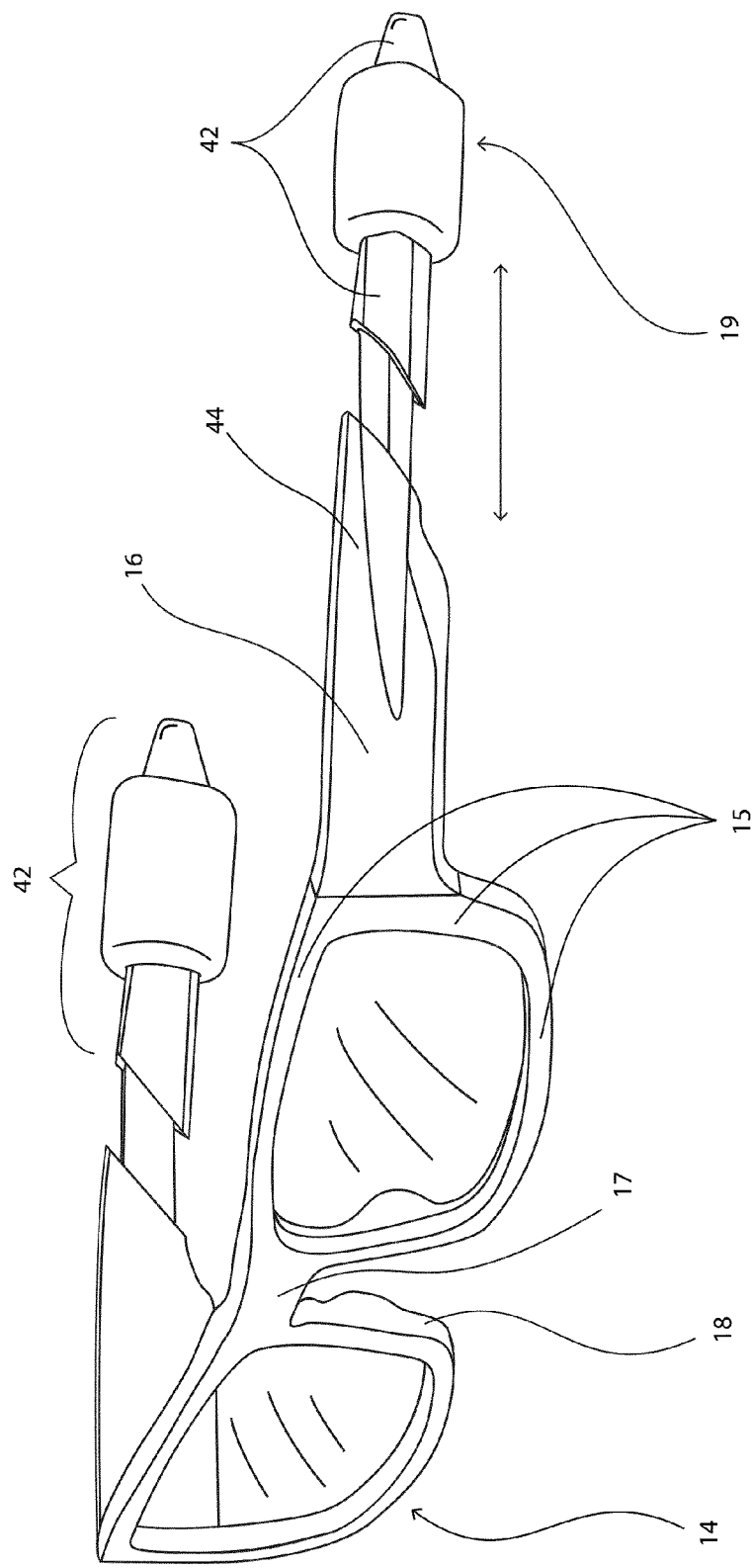
FIG. 11 shows a frontal and side perspective of eyewear with integrating temple sections with an attached cylindrical multi-radius mound, according to an embodiment of a device for stabilizing and maintaining the position of eyewear on a user.

Manufacturers of eyewear can integrate or add mounds having more than one radius to a separate distal section 42 of temple(s), FIG. 11. The distal temple section 42 can have an attached mound 19 of any shape with more than one radius to approximate a user's head. The mounds 19 with different radii can have flat shape-like exteriors that approximate the user's head as described in the cross section of FIG. 5 or cylindrical eccentric shapes with different radii as seen in FIGS. 3 and 4. The distal temple sections 42 can be integrated into one or more proximal temple sections 44 of eyewear. In one embodiment a distal temple section 42 with a smaller size can slide into a channel (not shown) in a proximal temple section 44 by a reversible or irreversible attaching means having a tight fitment lock. Other locking means, such as protrusions (not shown) in the distal temple section 42 can lock into openings (not shown) in the proximal temple section 44. The protrusions and openings can be located on either distal or proximal temple sections. In this embodiment the eccentric multi-radius mound 19 can be rotated on the distal temple section 42 to achieve the optimal interference fitment as previously described. Other connecting means for distal 42 and proximal 44 temple sections known in the art can be used, such as with magnets.

FIG. 12 shows the mound 19 having transitional radii 43 starting with the smallest anteriorly to the largest posteriorly and located on the medial side of the distal temple section 42. Sliding the distal temple section 42 into the proximal temple section 44 allows the user to move the distal temple section 42 anteriorly in relation to the user's head until the optimal interference fitment occurs between the mound radius and the user's lateral and posterior head region. In addition both temple sections 42, 44 can be fully integrated with the mound 19 located on the distal temple section. The mound 19 with transitional radii 43 can then be moved anteriorly or posteriorly on integrated temple sections 42, 44 to achieve the best interference fitment. The mound 19 on the distal temple section 42 can also be rotatable to allow optimal approximation of a mound radius with the user's head.

A non-rotatable multi-radius mound can also be integrated into the manufacture of the distal temple section 42 (not shown). For example, it is possible to manufacture a mound with more than one radius into the manufacture of temples. The multi-radius mound 19 would be positioned into a window formed in the wall of the distal temple section 42. One side of the mound would expose a large radius on the lateral side of the temple and the medial side of the temple wall would expose a smaller radius of the mound. When the distal temple section 42 is integrated with a proximal temple section 44, if the contacting radius of the mound 19 does not produce a good interference fitment, then the distal temple section 42 can be separated by reversing the attaching means from the proximal temple section 44. This allows the user to flip over the temple to the contralateral side, so that radius of the mound becomes the medial side of the distal temple section 42. Reattachment of the distal temple section 42 with the proximal temple section 44 then allows the previously contralateral mound radius to contact the user's head to provide improved interference fitment with the user's head. The positioning of the mound having two radii in this example could be set with a mound that does not have a channel as it could fit firmly into the stem window by mechanical interference fitment means. The mound would be configured so that one side has a larger radius protrusion in relation to the temple 40 and the other side would have a smaller protrusion radius. However an eccentric mound could have a channel with a slit, so that it would slip over and around a bar in the window or other similar configuration to position it in the window of the temple.

Figure 9:
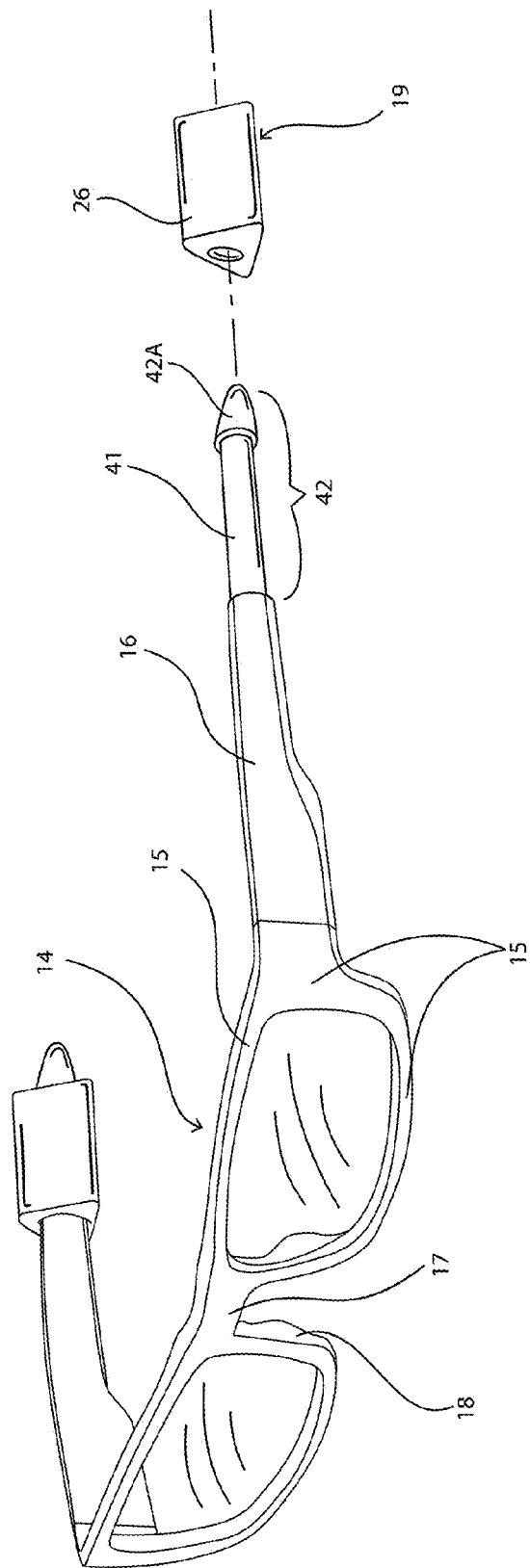
FIG. 9 shows a frontal and side perspective of eyewear with a multi-radius mound with flat sides integrated onto temples, according to an embodiment of a device for stabilizing and maintaining the position of eyewear on a user.
Figure 10:
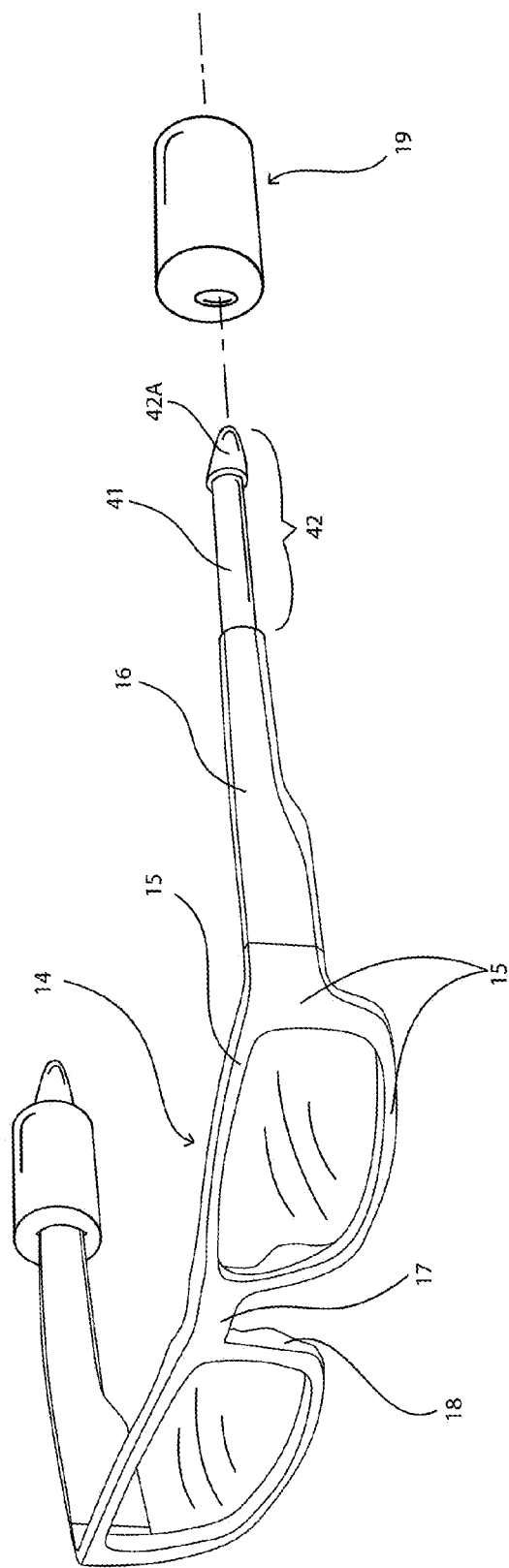
FIG. 10 shows a frontal and side perspective of eyewear with a multi-radius cylindrical mound integrated onto temples, according to an embodiment of a device for stabilizing and maintaining the position of eyewear on a user.

Another embodiment to integrate eccentric mounds 19 into temple manufacture are shown in FIGS. 9 and 10. The distal section 42 of temples 16 can have a reduced circumference 41 terminating in an expanded end 42A of the distal section 42. Mounds 19 made of stretchable compressible materials can fit over the expanded end 42A onto the reduced circumference 41 of the distal section 42 where they will be maintained in position by the fitment interference of the expanded end 42A. The mounds 19 in FIG. 9 can have flat sides 26 approximating the user's head and can be rotated in situ for the user to recognize when a different radius has been rotated into head contact to obtain the best radius interference fitment for stabilizing and maintaining the position of eyewear on a user. It is also understood that mound 19 can have a cylindrical eccentric shape shown in FIG. 10 or any other previously mentioned functional eccentric shape.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

The inventions being thus described, it will be obvious that the same may be varied in many ways. Such variations are not to be regarded as a departure from the spirit and scope of the inventions and all such modifications are intended to be included within the scope of the following claims.

What is claimed:

1. An adjustable device that stabilizes and maintains the position of eyewear on a user, said eyewear including a rigid or semi-rigid housing with a bridge positioned over and/or above a user's nose and temples connected to said housing extending distally away from connection to each side of said housing, said temple(s) terminating in an accessible posterior open end towards the user's ear(s) when said eyewear is situated on the user's head, the adjustable device comprising:
   a mound with a channel and having more than one radius;
   wherein said mound is located on said temples of said eyewear;
   wherein said mound has an adjustment means to achieve an optimal radius of said mound providing an interference fitment between said mound and the user's head; and
   wherein the interference fitment of said device maintains and stabilizes the positioning of said eyewear from displacement in multi-vectored directions away from on the user's nose and head.

2. The device of claim 1 wherein said mound is located on the distal section of said temple.

3. The device in claim 2 wherein said posterior end of said mound can be closed.

4. The device of claim 2 wherein said mound is comprised of a compressible material capable of expanding when slipped over said accessible posterior end of said temple and onto said distal section of temples, wherein said material retains said mound onto said temples.

5. The device of claim 2 wherein said distal section of temple has an expanded posterior end to retain said mound when said mound is positioned onto a reduced diameter section of said distal end of temple, wherein said mound is integrated and retained onto said reduced temple diameter section by size interference between said mound and said expanded posterior end of temple(s).

6. The device of claim 2 wherein said adjustment means is comprised of a mound with more than one radius transitioned from its anterior to posterior ends, wherein said radii of said mound can be positioned by anterior or posterior movement of said mound in situ on said distal section of temple to achieve optimal radius interference fitment of said mound with user's head, such that adjustment means maintain and stabilize the position of said eyewear on the user.

7. The device in claim 2 having a retainer strap with clamping means for attachment to said distal section of said temples of eyewear, wherein said mound with one or more channel(s) and more than one radius provides adjustment means to obtain an optimal radius interference fitment of said mound with user's head, and thereby maintain and stabilize the position of said eyewear on the user.

8. The device of claim 7 wherein said mound with more than one radius is combined with said clamping means of said retainer strap.

9. The device of claim 8 wherein said combined multi-radius mound clamping means has more than one channel and is rotatable clockwise or counterclockwise on said distal temple section to achieve optimal radius interference fitment between said mound and user's head to stabilize and maintain eyewear on a user's head.

10. The device of claim 1 wherein said adjustment means is comprised of an in-situ rotatable mound with more than one radius on said temple to achieve optimal radius interference fitment of said mound with user's head.

11. The device in claim 10 wherein said mound with more than one radius is any shape permitting unimpeded 360 degree or less rotation of said mound on said temple to permit contact of said mound with said user's head to optimize stabilizing and maintaining position for said eyewear on said user.

12. The device in claim 1 wherein said mound has a longitudinal slit to permit said mound to attach onto said temples.

13. The device of claim 1 wherein said mound(s) is integrated into the manufacture of said temple(s) of said eyewear.

14. The device in claim 1 wherein said interference fitment of said mound provides a pivoting mean for user to move said eyewear from a first position on user's nose to a superior second position on user's head or forehead and conversely from said second position to said first position.

15. A method for eyewear retention that stabilize and maintain positioning of eyewear on a user utilizing an adjustable device in claim 1, comprising:
   attaching said device with a multi-radius mound onto distal section of the temple(s);
   placing said eyewear onto the nose and head of said user to determine if an adjustment is required for optimal interference fitment between said mound and head of said user;
   adjusting said device by rotating said mound in situ on a temple to obtain radius for said optimal interference fitment when said adjustment is required;
   or adjusting said device by moving said mound in situ anteriorly or posteriorly to obtain radius for said optimal interference fitment; and replacing said eyewear onto nose and head of said user to maintain said eyewear in a position for optimal visual acuity.

16. An adjustable device that stabilizes and maintains the position of eyewear on a user comprising:
- said eyewear comprising a rigid or semi-rigid housing with a bridge located over and/or above a user's nose, said housing containing clear barrier(s) located over user's eyes, and said housing having attached temples that position said eyewear onto the head and nose of said user;
- at least one mound having more than one radius wherein said mound is located on said temples of the eyewear; and
- adjustment means on said mounds to achieve an optimal radius for interference fitment between said mound and the user's head to maintain and stabilize position of said eyewear from displacement in multi-vectored directions away from user's head and nose;
- said mound is integrated into the manufacture of said temples of said eyewear.

17. The device of claim 16 wherein said temple is comprised of two or more temple sections, wherein said mound is manufactured as part of one or more distal temple section(s), such that integration of said temple sections occurs by interconnecting said distal and other temple sections by a reversible or irreversible attaching means.

18. The device of claim 17 wherein said mound has more than one radius with a channel such that said mound is rotatable on said temple to obtain optimal interference fitment between said mound and said user's head.

19. The device of claim 17 wherein said mound has more than one radius on said distal temple section which can be moved anteriorly or posteriorly on said integrated temples by reversible lateral movement of said interconnecting means between said distal and other temple sections, thereby obtaining said optimal interference fitment between said mound and said user's head.

20. The device of claim 17 wherein said mound has one radius located on the medial side of said distal temple section and a different radius located on the contralateral side of said distal temple section, wherein disengagement of said distal temple section from a proximal temple section provides means to flip over said distal temple section so that said contralateral mound radius switches to a medial position for contact to user's head, wherein reattachment of said distal and proximal temple sections allows contact of said contralateral mound radius onto user's head, thereby obtaining said optimal interference fitment between said user's head and said mound.

* * * * *